(12) United States Patent
Picard (10) Patent No.: US 9,760,144 B2
(45) Date of Patent: Sep. 12, 2017

(54) DEVICES AND METHODS FOR TRANSMITTING POWER OVER AN ETHERNET LINE

(71) Applicant: Texas Instruments Incorporated, Dallas, TX (US)

(72) Inventor: Jean Picard, Hooksett, NH (US)

(73) Assignee: Texas Instruments Incorporated, Dallas, TX (US)

( * ) Notice: Subject to any disclaimer, the term of this patent is extended or adjusted under 35 U.S.C. 154(b) by 225 days.

(21) Appl. No.: 13/772,989

(22) Filed: Feb. 21, 2013

(65) Prior Publication Data
US 2013/0219195 A1 Aug. 22, 2013

Related U.S. Application Data

(60) Provisional application No. 61/601,996, filed on Feb. 22, 2012.

(51) Int. Cl.
*G06F 1/00* (2006.01)
*G06F 1/30* (2006.01)
*G06F 1/26* (2006.01)

(52) U.S. Cl.
CPC .............. *G06F 1/305* (2013.01); *G06F 1/266* (2013.01)

(58) Field of Classification Search
CPC .................................. G06F 1/26; G06F 1/3203
USPC ................................................. 713/300, 400
See application file for complete search history.

(56) References Cited

U.S. PATENT DOCUMENTS

| 2007/0223520 A1* | 9/2007 | Diab ...................... H04L 12/10 370/463 |
| 2008/0291039 A1* | 11/2008 | Picard ........................... 340/652 |
| 2009/0033345 A1* | 2/2009 | Picard et al. ................. 324/705 |
| 2011/0283118 A1* | 11/2011 | Maniktala .............. H04L 12/10 713/300 |
| 2013/0076133 A1* | 3/2013 | Gammel ................... H02J 4/00 307/31 |

OTHER PUBLICATIONS

OEM POE Solutions, OEM POE Solutions, Dec. 5, 2010, phihongusa.com/html/poe.html, "Ultra PoE (60-80W/port)" section.*

(Continued)

*Primary Examiner* — Jaweed A Abbaszadeh
*Assistant Examiner* — Austin Hicks
(74) *Attorney, Agent, or Firm* — William B. Kempler; Charles A. Brill; Frank D. Cimino (57) ABSTRACT

Circuits and methods for providing power from power sourcing equipment to a powered device using an ethernet cable are disclosed herein. An embodiment of the method includes detecting a resistance value in the powered device, wherein the resistance value determines whether the powered device can receive power. A first class event is performed to determine the class of the powered device. A second class event is then performed to determine the class of the powered device. Power is transmitted on all four pairs of the ethernet cable simultaneously when the first and second class events indicate that the class of the powered device conforms to a class that can receive power from the power sourcing equipment on all four pairs.

13 Claims, 4 Drawing Sheets

(56) References Cited

OTHER PUBLICATIONS

Clay Stanford, PoE Plus IEEE 802.3at Classification Ad Hoc Extended Classification Using Two Classification Events, Sep. 11, 2007, Linear Technology http://www.ieee802.org/3/at/public/2007/09/stanford_0907.pdf.*
Linear Technology, Linear Technology LTC427A/LTC4274C, Jan. 2012, Linear Technology.*
"Part 3: Carrier Sense Multiple Access With Collision Detection (CSMA/CD) Access Method and Physical Layer Specifications," IEEE Std. 802.3at, Oct. 30, 2009.
"Quad, IEEE 802.3at/af PSE Controller for Power-over-Ethernet," Max5980, Maxim Integrated Products, 19-5568, Rev. 0, 2010 (pp. 1-49).

* cited by examiner

DEVICES AND METHODS FOR TRANSMITTING POWER OVER AN ETHERNET LINE

This application claims priority to U.S. Provisional application 61/601,996 for HIGH POWER 4 PAIRS PoE CONFIGURATION AND CLASSIFICATION METHOD, filed on Feb. 22, 2012, which is hereby incorporated by reference for all that is disclosed.

BACKGROUND

Many electronic devices communicate with other devices using ethernet cables and ethernet standards or protocols. For example, clients and hosts may communicate with each other by way of an ethernet cable. An ethernet cable has four pairs of cables for a total of eight conductors. In some ethernet standards, only two of the four pairs are used for data transmissions. In more recent standards, all four pairs are used for data transmissions.

Electronic devices used for communications need to be powered and they need to transmit and receive data, which requires the electronic devices to be connected to both the ethernet cable and a power cable. In order to reduce the cabling and allow the electronic devices to be located away from power sources, power has been transmitted to the electronic devices by way of the ethernet cable. For example, a remote camera may be connected to an ethernet cable that provides for power to be transmitted to the camera and data to be transmitted to and from the camera. Thus, the location of the remote camera is not dependent on the location of a power source. Sending data and power over an ethernet cable is referred to as power over ethernet or PoE. The device supplying power is referred to as the PSE or power source equipment and the device being powered is referred to as the PD or the powered device.

Many of the ethernet standards include standards for PoE. In some standards only two of the four pairs of conductors are used for data transmissions. In these standards, one mode uses the same two pairs of conductors for data and power transmission. Another standard uses the two pairs of conductors that are not used for data transmissions to transmit power. A newer ethernet standard uses all four pairs of conductors for data transmission and two pairs for power transmission. These standards limit the amount of power that can be transmitted to a device using PoE.

Some of the standards require some sort of communication between the PSE and the PD. For example, the PSE may send data to the PD indicating the amount of power that it can source. The PD may also send data indicating that it is the type of device that can be powered. The data communications are time consuming and require additional hardware and software in the PSE and the PD, which increases their costs.

SUMMARY

Circuits and methods for providing power from power sourcing equipment to a powered device using an ethernet cable are disclosed herein. An embodiment of the method includes detecting a resistance value in the powered device, wherein the resistance value determines whether the powered device can receive power. A first class event is performed to determine the class of the powered device. A second class event is then performed to determine the class of the powered device. Power is transmitted on all four pairs of the ethernet cable simultaneously when the first and second class events indicate that the class of the powered device conforms to a class that can receive power from the power sourcing equipment on all four pairs.

DESCRIPTION

Circuits and methods for providing power to a device, sometimes referred to as a powered device (PD), by way of an ethernet connection are disclosed herein. A device, referred to as power source equipment (PSE), supplies power to the PD over an ethernet cable. There are several versions of ethernet cable standards, such as cat 5 and cat 6, however, they all use four pairs of conductors. The conductor pairs are often referred to simply as "pairs". Many ethernet standards use two pairs for data transmissions and the other two pairs are spares or used for power delivery. Some ethernet standards use two pairs for both data and power transfer and the remaining two pairs are not used.

Figure 1:
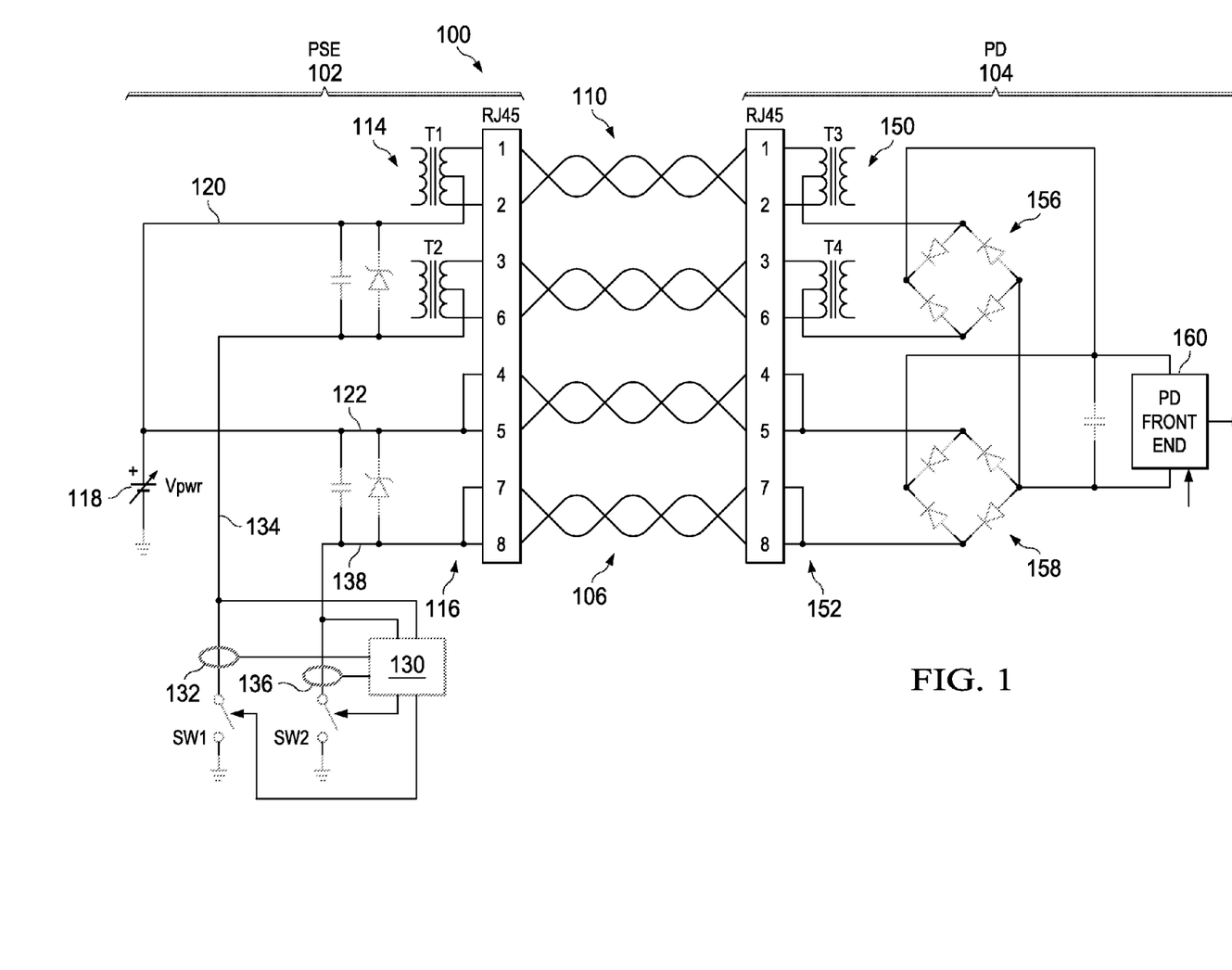
FIG. 1 is a schematic illustration of an embodiment of a first type of ethernet connection.

Reference is made to FIG. 1, which shows a schematic illustration of an embodiment of an ethernet connection 100. An "ethernet connection" as used herein includes devices that are electrically connected by way of an ethernet cable. The ethernet connection 100 has a PSE 102 connected to a powered device 104 by way of an ethernet cable 106. The PSE 102 may be a switch, router, or other device and may be connected or connectable to a plurality of other ethernet devices. The PSE 102 has a socket into which an ethernet plug of the ethernet cable 106 is connected or is connectable. The socket/plug combination is referred to as the PSE connection 110. The PSE connection 110 may be compatible with RJ45 plug and socket as is commonly known in the art. The PSE connection 110 has eight conductors, which correspond to the four pairs of conductors (or simply the four pairs) in the ethernet cable 106. In the embodiment of FIG. 1, there is only one PSE connection 110 shown for simplicity. In any embodiments, the PSE 102 may have a plurality of PSE connections to connect to a plurality of powered devices.

The PSE 102 of FIG. 1 uses two of the conductor pairs in the ethernet cable 106 for data transmission and two pairs for power distribution to the powered device 104. The conductors used for data transmission are referred to as the data pairs 114 and the conductors used for power transmission are referred to as the power pairs 116. The data pairs 114 are sometimes referred to as a first port 114 and the power pairs 116 are sometimes referred to as the second port 116. The data pairs 114 are connected to the ethernet cable 106 by way of a first data transformer T1 and a second data transformer T2. The data transformers T1, T2 each have a center tap that enables power to be transmitted to the powered device 104 in addition to data. The transmission of power and data to the powered device 102 is described below.

The PSE 102 has a power supply 118 that is connected to the first port 114 and the second port 116. As described below, the power supply 118 is used to drive a current between the PSE 102 and the powered device 104 and to supply power to the powered device 102. The current draw during a portion of the operation of the ethernet connection 100 is indicative of the front end of the powered device 104 as described below. As shown, the power supply 118 is connected to a first conductor 120 on the data pairs 114 and as first conductor 122 on the power pairs 116.

A current detector 130 is located within the PSE 102. The current detector 130 has a first sensor 132 that measures the current flow in a second conductor 134 of the data pairs 114. The detector 130 also has a second sensor 136 that measures the current flow in a second conductor 138 of the power pairs 116. The detector 130 controls two switches, a first switch SW1 and a second switch SW2. The first switch SW1 controls the current flow through the second conductor 134 of the data pairs 114 and the second switch SW2 controls the current flow through the second conductor 138 of the power pairs 116.

The powered device 104 includes data pairs 150 and power pairs 152 that are connected to their corresponding data pairs 114 and power pairs 116 in the PSE 102. The data pairs 150 are connected to two transformers, T3 and T4. The data power pairs 150 are connected to a first bridge rectifier 156 via the transformers T3, T4. The power pairs 152 are connected to a second bridge rectifier 158. Both the outputs from the first bridge rectifier 156 and the second bridge rectifier 158 are connected to a front end circuit 160. The front end circuit 160 has a current source, not shown, that sets the current drawn from the power supply 118. As described below, the current drawn by way of the front end circuit 160 is indicative of the type of the powered device 104 and the power that it can draw. The front end circuit 160 may perform many or all of the functions associated with determining the class of the PD 104. In some embodiments, the PD 104 has a single front end circuit 160 that performs the functions on all the pairs in the ethernet cable 106. For example, the front end circuit 160 may perform class events on one set of pairs followed by a second set of pairs. Therefore, the cost of the PD 104 is increased by the addition of another front end circuit when transmitting power on all four pairs of the ethernet cable 106.

The ethernet connection 100 of FIG. 1 may be a 100Base-TX configuration. In these types of configurations, there are typically two modes of operation, mode A and mode B. In mode A, the data pairs 114 are used for both data transmission and power transmission to the powered device 104. The power pairs 116 are not used and are sometimes referred to as the spare pairs. In mode B, the data pairs 114 are used for data transmission and the power pairs 116 are used to transfer power from the PSE 102 to the powered device 104. Conventional ethernet standards do not provide for power transfer on both the data pairs 114 and the powered pairs 116.

Figure 2:
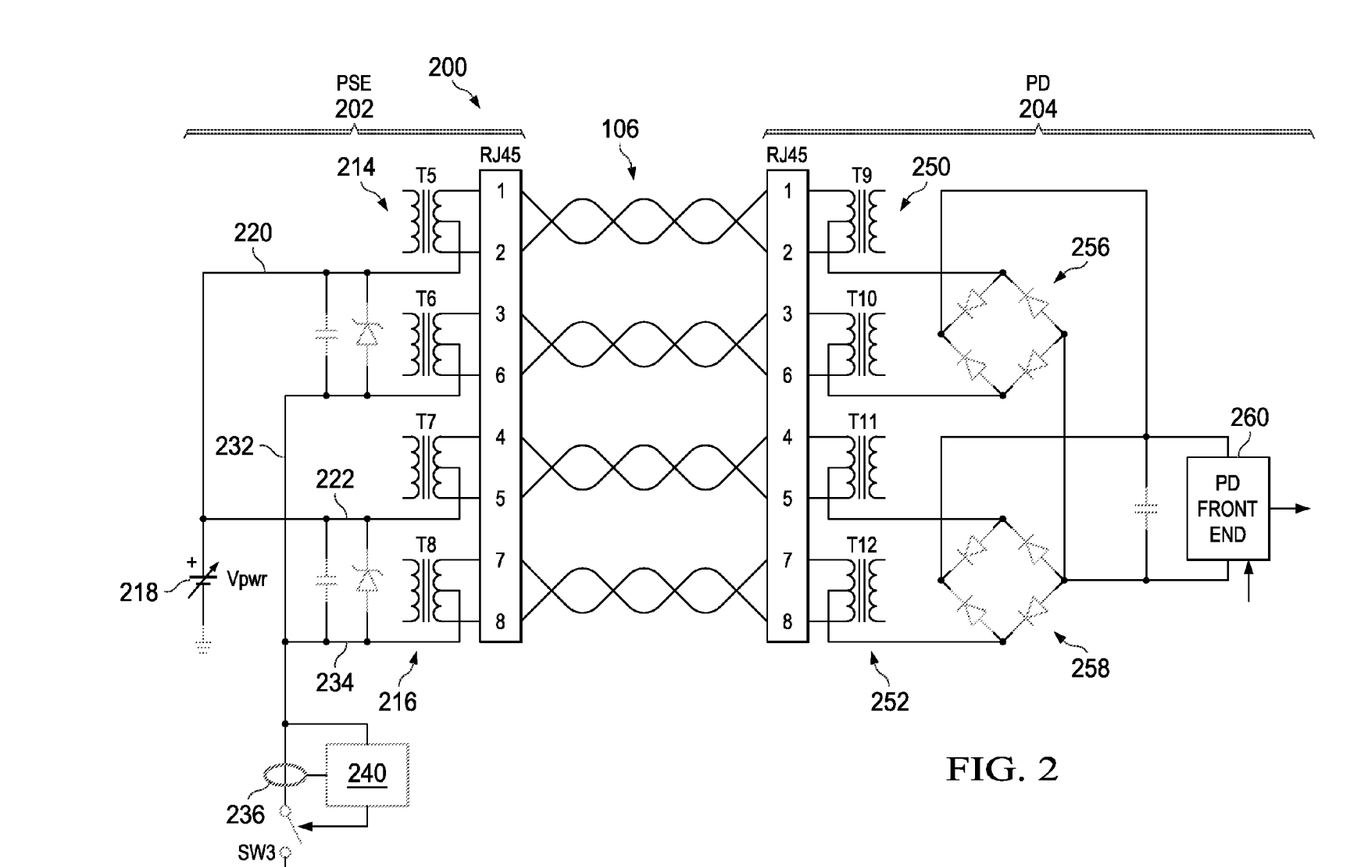
FIG. 2 is a schematic illustration of an embodiment of a second type of ethernet connection.

Reference is now made to FIG. 2, which shows an ethernet connection 200 using a gigabit or 1000Base-T ethernet configuration. The ethernet connection 200 transfers data on all four pairs of the ethernet cable 106. The ethernet connection 200 has a PSE 202 that is connected to a powered device 204 by way of the ethernet cable 106. Because the ethernet connection 200 uses all four pairs for data transmission, the PSE 202 has four data transformers T5-T8. The transformers T5 and T6 are connected to a first set of pairs 214, which is also referred to as a first port 214. The transformers T7 and T8 are connected to a second set of pairs 216, which is also referred to as a second port 218.

A power supply 218 is connected to a first conductor 220 in the first port 214 and a first conductor 222 in the second port 216. The first port 214 has a return or second conductor 232 and the second port 216 has a return or second conductor 234. The second conductors 232, 234 are connected together and pass through a current sensor 236. A detector 240 measures the current passing through the sensor 236. The detector 240 also controls a switch SW3 that connects the second conductors 232, 234 to ground. As with the ethernet connection 100 of FIG. 1, the first conductors 220, 222 and the second conductors 232, 234 provide power to the powered device 204.

The powered device 204 includes four data transformers T9-T12. The transformers T9 and T10 are connected to a first set of data pairs or a first port 250. The transformers T11 and T12 are connected to a second set of data pairs or a second port 252. The first port 250 is connected to a first bridge rectifier 256 and the second port 252 is connected to a second bridge rectifier 258. The outputs of the bridge rectifiers 256, 258 are connected to a front end 260 that is substantially similar or identical to the front end 160 of FIG. 1. Conventional internet connections using the internet connection 200 on transmit power on two of the four pairs, either the first port 214 or the second port 216.

Having described the two ethernet connections 100, 200, their operations will now be described. Procedures exist that enable the PSEs 102, 202 to determine the amount of power that the powered devices 104, 204 can receive when power is transmitted on only two of the four pairs of conductors in the ethernet cable 106. For example, the IEEE standard 802.3at defines the way in which the power determination is made. It is noted that the 802.3at standard does not permit power to be transmitted on all four pairs in the ethernet cable 106; rather, power is only transmitted on two pairs.

Referring to FIG. 1, the PSE 102 determines the power that may be delivered to the powered device 104. Sometimes the power that may be delivered to a powered device is referred to as the class of the powered device. In most applications, as the 802.3at standard, the highest class is referred to as class four, wherein 25.5 watts may be delivered to the powered device 104. For reference, a new class, class five, is described herein that enables power to be transferred to the powered device 104 using all four pairs in the ethernet cable 106. By using all four pairs, more power may be delivered to the powered device 104. In some embodiments, up to 70 watts may be delivered to the powered device 104.

The process for transmitting power to the powered device 104 is described below and is described with reference to the flowchart 300 of FIG. 3. In conventional ethernet connections, power may be transmitted on the first port 114 or the second port 116, but not both ports 114, 116. In the ethernet connections 100, 200 described herein, power may be transmitted on both the first port 114 and the second port 116. The process described in FIG. 3 determines whether the powered device 104 is capable of being powered by both ports 114, 116.

Figure 3:
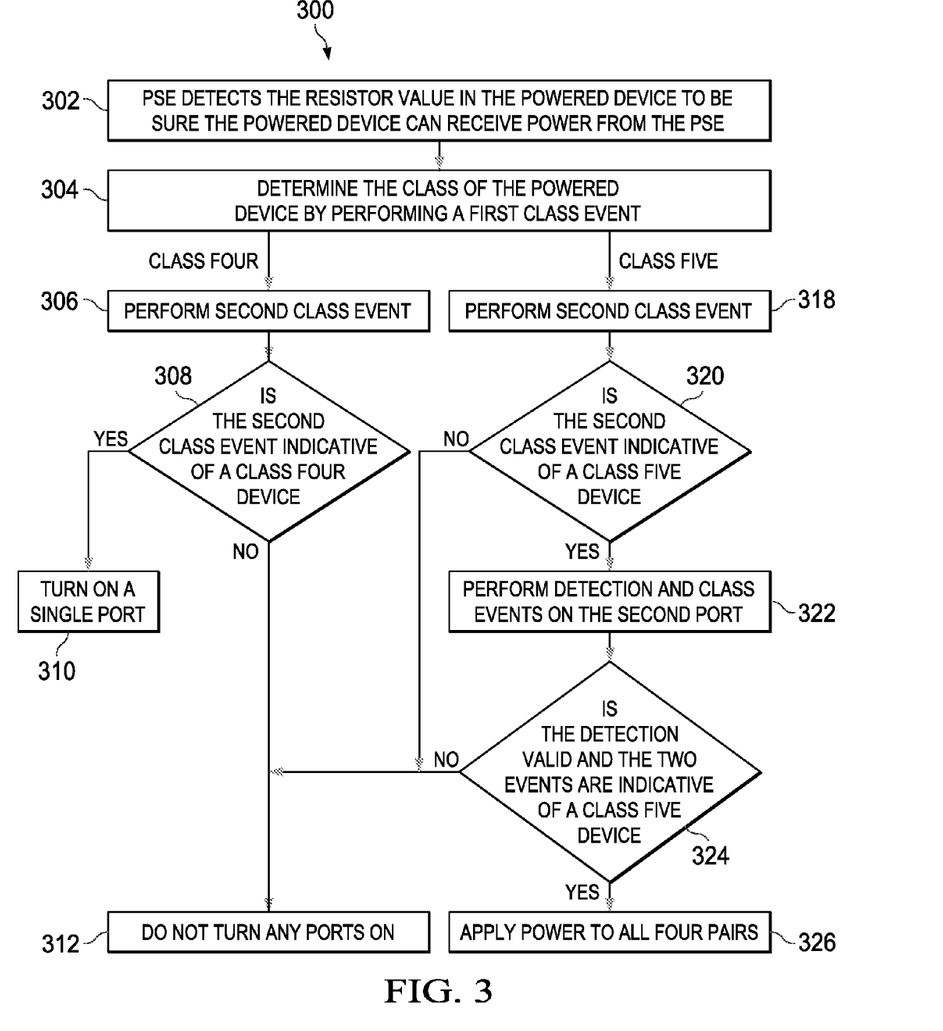
FIG. 3 is a flow chart describing an embodiment of a method for providing power to the powered device of FIG. 1.

The process described by the flowchart 300 of FIG. 3 commences with the PSE 102 detecting a resistance in the powered device 104 at step 302. The resistance may, as an example, have a value of 25 kΩ and may be connected between pairs in a port 150, 152. The resistance provides an indication to the PSE 102 that the powered device 104 is the type of ethernet device that can be powered by way of the ethernet cable 106. If the powered device 104 is not of the type to be powered by the PSE 102, the powered device 104 will not be powered by the PSE 102 and processing ceases.

If the result of step 302 is affirmative, the powered device 104 is configured to be powered by the powered device 102. Processing then proceeds to step 304 to determine the class of the powered device 102. The process for determining the class of the powered device 102 is referred to as a class event. With the class four and class five devices, there are two class events, a first class event and a second class event. Step 304 performs the first class event. The class of the powered device 104 is indicative of the power range of the powered device 104. Class four powered devices are meant to refer to conventional powered devices, such as those defined by the IEEE specification 802.3at. Class four devices are those that can only transmit power using two of the four pairs in the ethernet cable 106. Class five powered devices are meant to refer to those described herein as being able to receive power using all four pairs of the ethernet cable 106. In some embodiments, the current detector 130 measures the current in the lines 134, 138, which is indicative of the class of the PD 104. This current measurement may constitute a class event. By performing such measurements, the class of the PD is readily determined without the need for data communications between the PSE 102 and the PD 104.

If step 304 determines that the powered device is a class four device, processing proceeds to step 306 where a second class event is performed. This may follow the conventional steps set forth in other methods, such as those in IEEE 802.3at. Processing proceeds to decision step 308 where a determination is made as to whether the second class event indicates that the PD 104 is a class four device. If so, processing proceeds to step 310 where a single port is turned on or set to transmit power from the PSE 102 to the powered device 104. If the result of decision step 308 indicates that the second class event is not indicative of a class four device, processing proceeds to step 312 where no ports are turned on.

If step 304 determines that the powered device is a class five device, processing proceeds to step 318 where a second class event is performed. In some embodiments, the second class event may be performed on one of the ports 150, 152. For example, the second class event of step 318 may be performed on the data port 150 to determine if it can receive power from the PSE 102. Processing continues to decision step 320 wherein if the second class event determines that that the PD 104 is not a class five device, processing proceeds to step 312 and the ports 150, 152 are not operated to receive power from the PSE 102. More specifically, an anomaly exists and power should not be transmitted to the PD 104.

If the outcome of decision step 320 is positive, processing proceeds to step 322 where a detection and the first and second class events are performed on the second port. For example, the detection and class event may be performed on the power port 152 in order to assure that it too may receive power from the PSE 102. Step 322 may perform operations substantially similar or identical to those described in steps 302 and 308. The outcome of step 322 is reviewed at decision step 324. If the detection and classification, from the class events, indicates that the port is not a class five device, processing proceeds to step 312 and the port will not receive power. If however, the detection and classification from step 322 indicates that the port is class five device, processing proceeds to step 326. Step 326 applies power to all four pairs or both ports 150, 152 in the PD 104. By using all four pairs, more power may be delivered to the PD 104 than using only two of the four pairs.

The power is applied to the powered device 104 using all four pairs in the ethernet cable 106. It is noted that each port may be classified or otherwise tested individually to determine if they can accept power from the PSE 102. Thus, the same front end 160 used in conventional powered devices may be used in the powered devices 104 that receive power on all four pairs. In some embodiments, slight changes may be required for the front ends 160, but the are minimal and only one front end 160 is needed for each powered device 160. It is also noted that the new class five was established without data communications between the PSE 102 and the PD 104. Thus, communications components and the like were not required to be added to either the PSE 102 or the PD 104.

A similar process is used for the ethernet connection 200 shown in FIG. 2 where all four pairs are used for data transmissions. The process is shown by the flowchart 400 of FIG. 4. The process described by the flowchart 400 of FIG. 4 commences with the same process as the flowchart 300 of FIG. 3. The PSE 202 detects a resistance in the PD 204 at step 402. The resistance may, as an example have a value of 25 kΩ. The resistance provides an indication to the PSE 202 that the PD 204 is the type of ethernet device that can be powered by way of the ethernet cable 106. If the PD 204 is not of the type to be powered by the PSE 202, the PD 204 will not be powered by the PSE 202.

Figure 4:
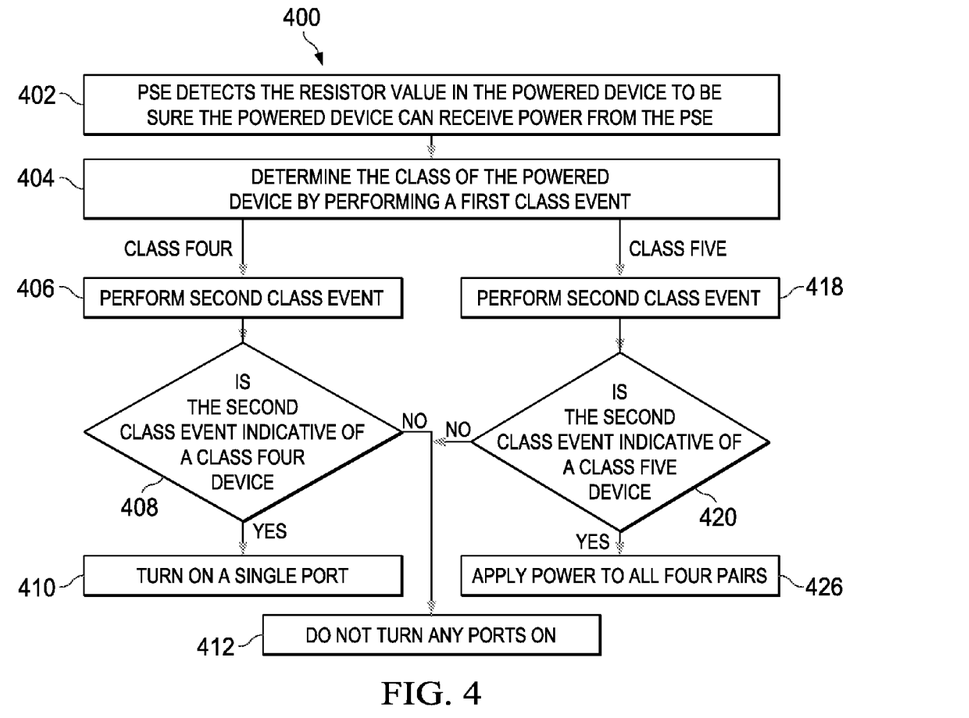
FIG. 4 is a flow chart describing an embodiment of a method for providing power to the powered device of FIG. 2.

As with the flowchart 300, if the result of step 402 is affirmative, the PD 204 is configured to be powered by the PSE 202. Processing then proceeds to step 404 to determine the class of the PD 202 by performing a first class event. If step 404 determines that the powered device is a class four device, processing proceeds to step 406 where a second class event is performed as described with reference to the flowchart 300. Processing proceeds to decision step 408 where a determination is made as to whether the second class event indicates that the PD 104 is a class four device. If so, processing proceeds to step 310 where a single port is turned on or set to transmit power from the PSE 202 to the powered device 204. If the result of decision step 308 indicates that the powered device 204 is not a class four device, processing proceeds to step 412 where the device is not powered by the PSE 202.

If step 404 determines that the PD 204 is a class five device, processing proceeds to step 418 where a second class event is performed. Because the ethernet connection 200 uses all the pairs for data transmission, they are all the same or substantially similar. Therefore, only one port needs to be tested or classified instead of two ports as with the connection 100 of FIG. 1. Processing continues to decision step 420 wherein a determination is made to as to whether the detection was valid and the second class event is indicative of a class five device. If the result of decision step 420 is negative, processing proceeds to step 412 and the device does not receive power from the PSE 202. If the outcome of decision step 420 is positive, processing proceeds to step 426. Step 426 applies power to all four pairs in the powered device 204.

In the case of the internet connection 200 of FIG. 2, both ports 214, 216 are used for data transmission. More specifically, all the pairs in the ethernet cable 106 are connected to data transformers T9-T12. In these embodiments, the PSE 202 may open a single port for power transmission because all the pairs are identical.

Figure 5:
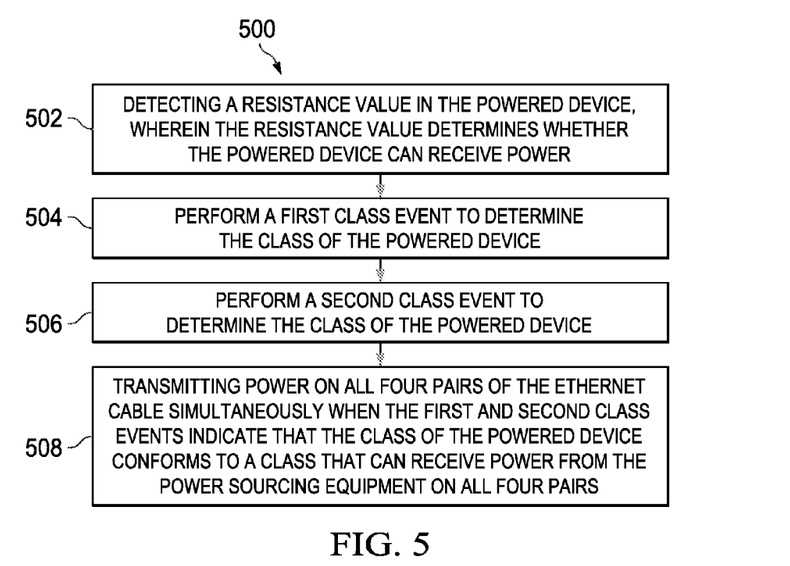
FIG. 5 is a flow chart describing another embodiment of a method for providing power to the powered device of FIG. 1.

A method of providing power from power sourcing equipment 102, 202 to a powered device 104, 204 using an ethernet cable 106 is described by the flow chart 500 of FIG. 5. The flow chart 500 describes a method that commences at step 502 with detecting a resistance value in the powered device 104, 204, wherein the resistance value determines whether the powered device 104, 204 can receive power. At step 504 a first class event is performed to determine the class of the powered device 104, 204. At step 506 a second class event is performed to determine the class of the powered device. At step 508, power is transmitted on all four pairs of the ethernet cable 106 simultaneously when the first and second class events both indicate that the class of the powered device 104, 204 conforms to a class that can receive power from the power sourcing equipment 102, 202 on all four pairs.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A method of providing power from power sourcing equipment to a powered device using an ethernet cable by determining a class of the powered device without the need for data communication between the power sourcing equipment and the powered device, wherein the powered device comprises a front end circuit and wherein the front end circuit performs a first class event on all of the sets of conductor pairs and wherein the ethernet cable has four conductor pairs, the method comprising:
    detecting a resistance value in the powered device, wherein the resistance value determines whether the powered device can receive power;
    performing the first class event utilizing a current that is outside the range required by IEEE standard 802.3at to determine the class of the powered device, wherein performing the first class event comprises performing a first class event on a first set of conductor pairs in the powered device followed by performing the first class event on the remaining conductor pairs in the powered device;
    performing a second class event utilizing a current that is outside the range required by IEEE standard 802.3at to determine the class of the powered device;
    if the second class event indicates that the powered device is a class five device which can receive power on all four pairs of conductors, perform detection and a class event on a second conductor pair;
    if the detection on the second conductor pair is valid and the class event on the second conductor pair are indicative of a class five device, then
    transmit power on all four pairs of the ethernet cable simultaneously.

2. The method of claim 1, wherein performing a second class event comprises performing a second class event on a first set of conductor pairs in the powered device followed by performing the second class event on the remaining conductor pairs in the powered device.

3. The method of claim 1, wherein the performing the first class event and performing the second class event are conducted on all the pairs of conductors before power is transmitted to the powered device.

4. The method of claim 1, wherein the power sourcing equipment and the powered device transmit data using all four conductor pairs, and wherein transmitting power comprises utilizing a single port for power transmission.

5. The method of claim 1, wherein transmitting power comprises transmitting at least sixty watts to the powered device.

6. The method of claim 1, wherein the power sourcing equipment and the powered device transmit data on two of the four conductor pairs, and wherein transmitting power comprises opening a port for power transmission on the two conductor pairs used for data transmission and opening another port for the two data conductors not used for data transmission.

7. A powered device that is connectable to an ethernet cable, the ethernet cable being connectable to power sourcing equipment, the powered device comprising:
    four conductor pairs that are connectable to the four conductor pairs in the ethernet cable;
    a single front end circuit that provides class information to the power sourcing equipment on all four of the conductor pairs, wherein the front end provides current to the power sourcing equipment indicative of the class of the powered device, wherein a current outside the range required by IEEE standard 802.3(at) indicates a fifth power classification, wherein the single front end provides class information to the power sourcing equipment on a first set of conductor pairs followed by a second set of conductor pairs;
    wherein power and data are able to be supplied from the power sourcing equipment on all four conductors pairs simultaneously at a power level that exceeds that capable of being transmitted under IEEE standard 802.3(at) without the need for data communication between the power sourcing equipment and the powered device.

8. The powered device of claim 7, wherein the single front end provides class information to the power sourcing equipment on a first set of conductor pairs followed by a second set of conductor pairs prior to receiving power from the power sourcing equipment.

9. The powered device of claim 7, wherein at least sixty watts is able to be supplied to the powered device.

10. An ethernet connection comprising:
    power sourcing equipment connectable to a powered device by way of an ethernet cable, the power sourcing equipment comprising:
    four pairs of conductors wherein power is able to be supplied to the powered device by way of all four pairs of conductors simultaneously; and
    at least one detector for detecting whether the powered device can receive power and the class of the powered device wherein the detector comprises: a circuit for detecting a resistance value in the powered device, wherein the resistance value determines whether the powered device can receive power;
    a circuit for performing a first class event utilizing a current that is outside the range required by IEEE standard 802.3(at) to determine the class of the powered device, when performing a first class event comprises performing a first class event on a first set of conductor pairs in the powered device;
    a circuit for performing a second class event utilizing a current that is outside the range required by IEEE standard 802.3at to determine the class of the powered device;
    a circuit for determining if the second class event indicates that the powered device is a class five device which can receive power on all four pairs of conductors and to perform detection and a class event on a second conductor pair;

a circuit for determining if the detection on the second conductor pair is valid and the class event on the second conductor pair are indicative of a class five device, then transmitting power on all four pairs of the ethernet cable simultaneously;

the powered device comprising:

a front end circuit that provides a resistance indicative of whether the powered device can receive power and a current indicative of the class of the powered device, wherein the powered device comprise a single front end circuit that provides current indicative of the class of the powered device on a first set of conductor pairs followed by a second set of conductor pairs;

wherein power is transmitted from the power sourcing equipment to the powered device on all four pairs of the ethernet cable simultaneously only when the powered device indicates that it is a class five device and without data communication between the power sourcing equipment and the powered device.

11. The ethernet connection of claim 10, wherein the powered device receives power from the power sourcing equipment after the front end circuit has provided current indicative of the class of the powered device on all of the conductor pairs.

12. The ethernet connection of claim 10, wherein the ethernet connection is of the type configured to transmit data on all four pairs of conductors and wherein the power sourcing equipment opens a single port for transmission of power on all four pairs of conductors.

13. The ethernet connection of claim 10, wherein the ethernet connection is of the type configured to transmit data on two of the four pairs of conductors and wherein the power sourcing equipment opens a single port for transmission of the two conductor pairs configured to transmit data and an single port for the remaining conductor pairs.

* * * * *